Feb. 15, 1966  A. VISCHER, JR  3,235,390
FROZEN FOOD PACKAGE AND METHOD OF MAKING THE SAME
Filed April 23, 1962
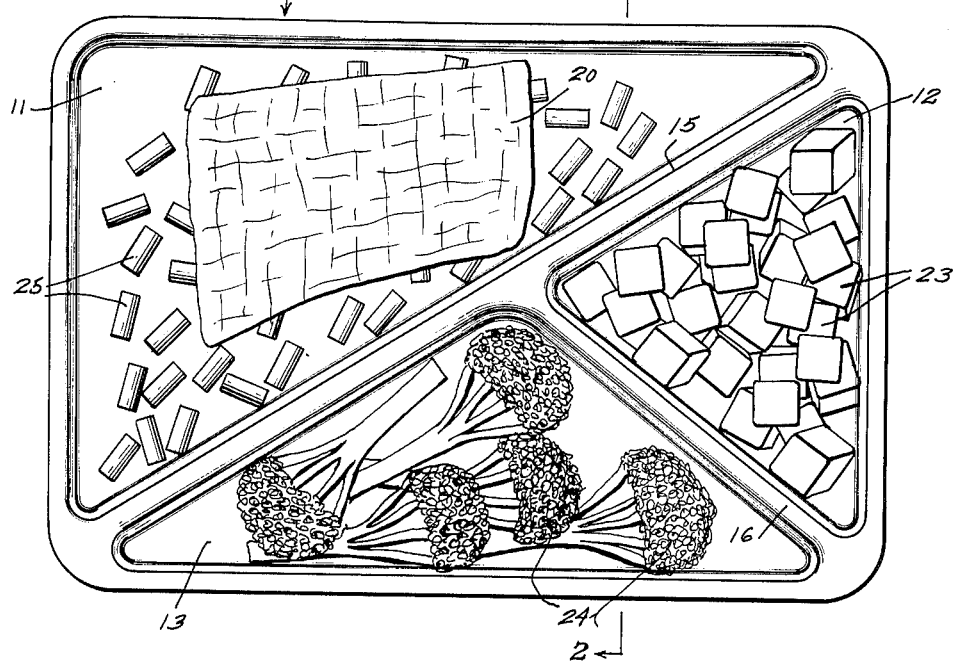
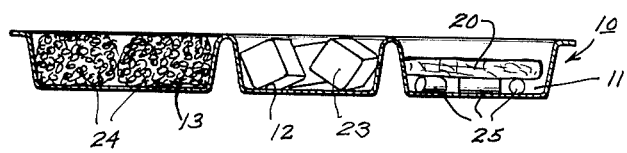
INVENTOR.
Alfred Vischer, Jr.
BY
Fidler, Beardsley & Bradley
ATTORNEYS

United States Patent Office 3,235,390
Patented Feb. 15, 1966

3,235,390
FROZEN FOOD PACKAGE AND METHOD OF
MAKING THE SAME
Alfred Vischer, Jr., 909 S. Cumberland Ave.,
Park Ridge, Ill.
Filed Apr. 23, 1962, Ser. No. 189,501
4 Claims. (Cl. 99—194)

The present invention relates to the processing and packaging of food and it has for a particular object the provision of a new and improved package in which a plurality of frozen food items are contained in a single container for simultaneous defrosting and cooking and/or heating in a single high temperature operation.

Another object of this invention is to provide an improved method and means for packaging frozen food items so as to reduce the time required to later defrost and heat such items to a serving temperature.

At the present time many foods are precooked and thereafter packaged and frozen for purposes of preservation. Accordingly, in order to prepare the food for serving, it must usually be defrosted and heated to the serving temperature. Generally this is done in a single high-temperature operation, although where time is not a factor, the food may be thawed at a temperature less than a cooking temperature. This latter procedure, however, is not commonly used, because of excessive loss of food values and speed of preparation. Hence, it is desirable to defrost and heat the food as quickly as possible in one high-temperature operation. With the techniques now used for packaging frozen foods, the time required to defrost and heat the precooked frozen food is relatively long, even when high temperatures are used, and this time often exceeds the time which would be required to cook the same foods either fresh or frozen, in the first place. Accordingly, it would be desirable to provide new and improved methods and means of packaging frozen foods so as to appreciably reduce the time required to defrost and heat them.

In addition to merchandising frozen foods in bulk quantities, it has been the practice to package, in a single container, a substantially complete meal for one person. Such a meal generally contains a serving of meat or fish, and one or more servings of different vegetables and each of these different food items is completely cooked prior to freezing. Since a balanced meal of this type normally includes vegetables which are substantially different in texture and composition from one another, as, for example, broccoli and potatoes, and since the composition and texture of vegetables is substantially different from meat, when the entire unit is defrosted and heated in a single high temperature operation the vegetables become overcooked by the time the meat has been heated to a satisfactory serving temperature. This is particularly true where the meat serving includes gravy which, because of its inherent liquid nature, freezes solid during the freezing operation and ordinarily having surrounded the meat causes the meat also to be frozen into a substantially solid block of ice.

Being a block of ice, the meat portion requires the absorption of a large quantity of heat in order to melt and this results in two important disadvantages. One, the over-all time to defrost and heat the meal to serving temperature is extremely long, and two, the other parts of the meal, i.e., the vegetables, become greatly overcooked before the meat is ready to serve. It would be desirable, therefore, to process and package a frozen meal in such a way that the time required to defrost the meat portion is minimized and, moreover, that all of the separate food items contained in the same package and making up the meal would be raised to the serving temperature and would become completely cooked at the same time.

In accordance with one feature of the present invention the meat is completely precooked while the vegetables are frozen in the raw or partially cooked state, depending on the cross section and texture of the food items. Moreover, the physical shape of the meat is selected in relation to the characteristics of the meat and that of the associated vegetables so that when the meat has been defrosted and heated to the serving temperature only a sufficient time has elapsed for the vegetables to have defrosted and to then have been cooked to the desired degree so that no overcooking occurs.

Inasmuch as the gravy or sauces normally require and/or cause the meat or fish to require the greatest amount of defrosting time of all the items in a single meal, containing roots and greens, in accordance with another feature of the present invention the gravy or sauces are frozen in the form of small, separate pellets which may be arranged within the meat-holding compartment of the container so that the gravy or sauce has a high surface area-to-volume ratio and the time required to defrost and heat the meat and the gravy or sauce is greatly diminished. Preferably, the meat is cooked and frozen separately from the gray so that a maximum defrosting speed for the meat can be achieved.

As a result of a proper selection of the configuration of the container and of the individual portions of food contained therein, it will generally be found that in order for all of the items to reach the desired serving temperature and be properly cooked, at least one of the items should be completely precooked before freezing and varying amounts of partial precooking or no cooking at all will be required for the other items. A minimum time for defrosting, heating and cooking of the meal will be achieved by fully cooking that item which requires the greatest defrosting and heating time, and freezing the other items in an uncooked or predetermined partially precooked state.

Further objects and advantages and a better understanding of the present invention may be had by reference to the following detailed description taken in connection with the accompanying drawing in which:

FIG. 1 is a top plan view of a package of frozen food constructed in accordance with the teachings of the present invention, the top of the package being removed to show the disposition of the food items therein; and FIG. 2 is a cross-sectional view taken along the line 2—2 of FIG. 1, assuming the entire device to be shown therein.

Referring now to the drawing and particularly to FIG. 1 thereof, there is shown a food containing tray 10 formed of a suitable material having good heat transfer characteristics such, for example, as aluminum, and having a plurality of separate compartments 11, 12 and 13 therein separated by integral wall forming deformations 15 and 16 in the bottom of the tray. A cover, not shown, is secured across the top of the tray 10 prior to freezing. The tray 10 has a relatively shallow depth, as best shown in FIG. 2, whereby the food contained therein may be conveniently eaten directly from the tray 10 without transfer to a separate plate.

The compartment 11, being the larger of the three compartments, preferably holds the meat or fish serving and, therefore, a piece of frozen meat 20 which has been completely precooked prior to freezing is disposed in the compartment 11. The compartment 13 is a vegetable compartment and contains a serving of, for example, broccoli 24, which has been frozen while in the raw state. The compartment 12 contains another vegetable, such, for example, as potatoes 23, which were partially cooked prior to freezing because of their size. Had the potatoes been diced, they should be frozen in the uncooked or raw state. A sauce or gravy is included in the meat compartment 11 in the form of a plurality of small, frozen pellets 25 which may, for example, be substantially cylindrical in shape. It will be understood that other shapes may be used for the pellets 25 and where a greater surface area-to-volume ratio is desired, other shapes may be conveniently used.

Since the sauce or gravy 25 consists of a plurality of frozen pellets, the meat portion of the meal contained in the package 10 is not a solid block of ice, as is normally the case in prior art frozen meal units. Preferably, the meat 20 is frozen in the relatively dry state. At the time of heating, of course, the gravy or sauce has melted down from the individual pellets and can then be placed on the meat or other food item by the user as desired.

It will be seen that the entire process should be geared to that particular food item which requires the greatest amount of time to be defrosted and heated. Moreover, every effort should be made to minimize this time by selecting the shape of each food item so as to maximize, where possible, the surface area-to-volume ratio, by freezing it in as dry a state as possible and by freezing the associated sauce or gravy separate therefrom. Preferably, the tray 10 should be formed of a flat, black surfaced material so as to take advantage of black body absorption and radiation of heat thereby to further reduce the time required to defrost and heat or cook the dinner contained therein.

In my co-pending application, Serial No. 188,096 filed April 17, 1962, there is disclosed methods and means for packaging liquid or viscous food items such, for example, as soup, and it should be readily understood that gravy may be frozen in wafers as taught in the said co-pending application and used in the package 10 in place of the pellets 25. Irrespective of the particular configuration of the individual gravy or sauce units, it is important that they be frozen separately from the meat and that they be arranged to provided air passages around the surface areas thereof.

In the package of FIG. 1, the partitions between the separate food items comprise deformed or upstanding portions of the tray. However, in order to facilitate eating directly from the tray, it would be desirable to eliminate such partitions while preventing the intermingling of the various food items. This can be accomplished by selecting certain types of foods as the partitions or spacer elements. For example, a few spears of asparagus will provide a satisfactory partition between a meat serving and a vegetable serving. In like manner, a banana will provide a suitable partition between one food item and another. Various other types of elongated foods, such as carrots and celery can be used for this purpose. In this way, the difficulty of eating associated with the upstanding partitions is avoided.

While the present invention has been described in connection with particular embodiments thereof, it will be understood that those skilled in the art may make many changes and modifications without departing from the true spirit and scope of the invention. Therefore, it is intended by the appended claims to cover all such changes and modifications as come within the true spirit and scope of the invention.

I claim:

1. A method of freezing and packaging a food product comprising a combination of a liquid and a meat product comprising the steps of freezing said meat product separate from said liquid, freezing said liquid in a plurality of individual units, and packaging the frozen meat product and a plurality of said frozen units together in a single container in which said frozen food product is to be heated for serving whereby the time required to later defrost and heat the product to a serving temperature is reduced.

2. The method of claim 1 wherein said liquid is a gravy.

3. A frozen food package comprising
   a container formed of a good heat conducting material,
   a frozen meat product which when defrosted is in the solid state disposed in said container, and
   another frozen food product which when defrosted is in the liquid state,
   said another frozen food product also being disposed in said container and being in the form of a plurality of small, randomly disposed pellets, each having a high surface area-to-volume ratio and providing a plurality of randomly disposed interconnected passageways extending between said pellets,
   whereby the time required to later defrost and heat said products to a serving temperature is reduced.

4. A frozen food package as set forth in claim 3 wherein a plurality of said pellets are loosely disposed in the bottom of said container and said frozen meat product is supported on said pellets whereby to provide an air space between said frozen meat product and the bottom of said container.

References Cited by the Examiner

UNITED STATES PATENTS

| 2,674,536 | 4/1954 | Fisher | 99—192 |
| 2,714,070 | 7/1955 | Welch | 99—192 X |
| 2,801,930 | 8/1957 | Paulucci | 99—192 X |
| 2,878,128 | 3/1959 | Jorgenson | 99—192 |
| 3,079,912 | 3/1963 | Griem | 99—192 |
| 3,079,913 | 3/1963 | Nelson | 99—192 |

OTHER REFERENCES

Packaging Parade, May 1945, pages 36 and 41.

Tressler et al.: "The Freezing Preservation of Foods," The Avi Publishing Co., New York, N.Y., 1947; pages 438–446, 449, 452–454.

A. LOUIS MONACELL, *Primary Examiner.*

ABRAHAM H. WINKELSTEIN, RAYMOND N. JONES, *Examiners.*